United States Patent [19]
Chappell

[11] 3,966,095
[45] June 29, 1976

[54] HORIZONTALLY-OPERATED PUMP-TYPE DISPENSER

[75] Inventor: Albert R. Chappell, Jerseyville, Ill.

[73] Assignee: The Metalife Company, Wentzville, Mo.

[22] Filed: Apr. 9, 1975

[21] Appl. No.: 566,175

[52] U.S. Cl. .............................................. 222/384
[51] Int. Cl.² ......................................... B67D 5/42
[58] Field of Search ............ 222/384, 385; 239/331

[56] References Cited
UNITED STATES PATENTS

| | | | |
|---|---|---|---|
| 2,873,892 | 2/1959 | Nelson et al. | 222/385 X |
| 2,878,974 | 3/1959 | Dobkin | 222/385 X |
| 2,980,343 | 4/1961 | Hays | 239/331 |
| 3,406,909 | 10/1968 | Pfeiffer | 222/385 |

*Primary Examiner*—Stanley H. Tollberg
*Assistant Examiner*—Norman L. Stack, Jr.

[57] ABSTRACT

A pump-type dispenser for liquids, such as liquid soap, operates with the pump mechanism horizontal, lifting liquid from a bracket-suspended vessel through a dip tube at the back end of the pump. The pump mechanism is compact, having two rubber valves of the type whose lips project along the line of flow. The first valve is mounted at the inlet of the pump cylinder, where it is retained by the dip tube. The second valve is mounted within the pump piston; it is there retained by the smaller end of the pump spring, a tapered wound wire spring whose larger end surrounds the lips of the first valve. The pump mechanism with tube attached is replaceably mounted by inserting the dip tube through the front end of the bracket which suspends the vessel and camming it downward.

2 Claims, 4 Drawing Figures

HORIZONTALLY-OPERATED PUMP-TYPE DISPENSER

BACKGROUND OF THE INVENTION

The present invention relates to pump type dispensers for liquids such as liquid soap, and particularly to that type of dispenser having a valved pump which lifts the liquid from a suspended vessel through a dip tube.

Pump mechanisms for lifting and dispensing such liquids have taken many forms, but are ordinarily constructed to operate in upright position, in which a piston plunger is pressed downward. The valves in such pump mechanisms may operate in part by gravity. This arrangement, well suited for hand-held dispensers, is inconvenient for use in factories and institutions where dispensers of hand cleaning substances are mounted on walls; for such use it is easier to press a pump plunger horizontally. Dispensers having plungers so aligned usually drain the liquid to be dispensed from a vessel positioned above the level of the plunger. Such non-pumping dispensers do not require two valves in the line of flow. However, they are more subject to leakage and their liquid-containing vessels are not readily changed.

SUMMARY OF THE INVENTION

The purposes of the present invention include providing for horizontal operation of the pump of a dispenser which suspends beneath it a readily-changed vessel of the liquid to be dispensed. Further objects are to to provide for compactness of the pump mechanism, simplicity of manufacture and assembly, and ease of removing and replacing the pump mechanism.

Summarizing generally and without limiting the scope of the invention, I provide a dispenser pump operable in horizontal position, which is compact and easy to assemble and disassemble. The pump includes a cylinder member having at one end a reduced concentric inlet in which a molded rubber-like valve is positioned, the lips of the valve projecting inwardly. A dip tube holds this first rubber valve in position at the cylinder inlet.

Within the cylinder is a hollow piston member carrying within it a second valve similar to the first. Between the piston and the inlet end of the cylinder is a tapered wound wire compression spring, whose larger end abuts the cylinder end surrounding the inward projecting lips of the first valve and whose smaller end is presented against the body portion of the second valve. No other retention means is required for the two valves, which close on excess of pressure outwardly of their lips and open on excess of pressure inwardly of their lips, hence operating reliably in horizontal position.

The dispenser pump is mounted in a cylindrical chamber portion at the forward end of a mounting bracket, the chamber having an aft wall which curves downwardly and leads to a downward presented vessel support opening. The pump with dip tube attached may be replaceably installed by inserting the lower end of the dip tube aft through the forward end of the bracket and camming it against the curved surface portion at the aft end of the chamber to press it downward through the vessel support opening. Such installation permits easy replacement of the dispenser pump assembly, as well as simple screw attachment and removal of the liquid-containing vessel.

DESCRIPTION OF THE PREFERRED EMBODIMENT

Figure 1:
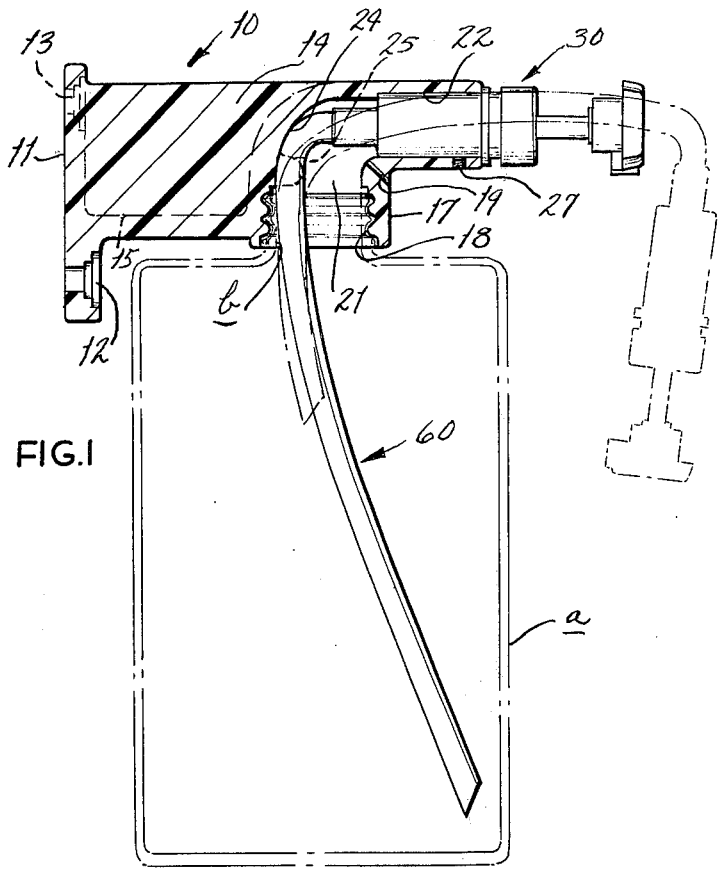
FIG. 1 shows the pump of the present dispenser in elevation, installed in its dispenser bracket shown in section. The phantom lines show a suspended vessel, into which the dip tube of the pump descends, and also show the pump partly installed on the bracket.
Figure 2:
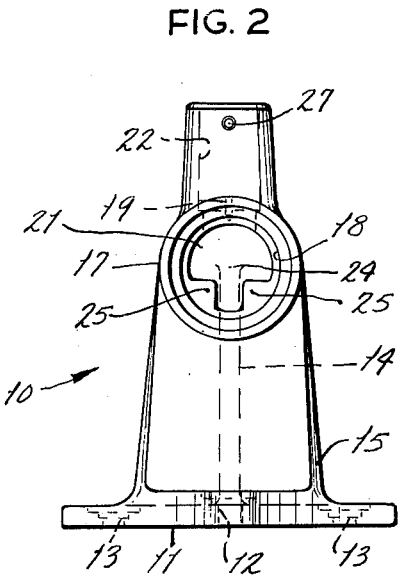
FIG. 2 is a bottom view of the dispenser bracket.

The bracket generally designated 10 of the present dispenser is a rugged cast metal bracket having a plate-like aft mounting portion 11 with a lower mounting bore 12 located at its central plane, shown in the cross-section FIG. 1, and having at its upper extremities, spaced from said plane, two upper mounting bores 13. Projecting forwardly from the plate-like mounting portion 11, along the central plane shown, is a central vertical rib 14 which rises from a lateral rib 15 best seen in the bottom view FIG. 2. At the forward end of the rib 15, spacedly forward from the mounting portion 11, is a portion formed to circular cross-section about a vertical axis, termed a vessel support 17 and having internal threads 18. Entering through its forward wall above the threads 18 is an air inlet 19.

The interior of the vessel support 17 and of the portion of the bracket above the threads 18 is in effect the aft portion 21 of a bracket chamber whose forward chamber portion 22 is cylindrical and substantially horizontal when the bracket 10 is mounted to a vertical wall by the mounting plate 11. As best seen in FIG. 1, the aft chamber portion 21 has a downward and aft curving wall 24 leading between two guide lobes 25 above the threads 18. The lobes 25 are so spaced from the vertical central plane of the bracket as to guide the dip tube, hereafter referred to, and accommodate it securely between them.

A small set screw 27 in a threaded bore in the forward chamber portion 22 is used as a retainer for the pump mechanism hereafter described.

Figure 3:
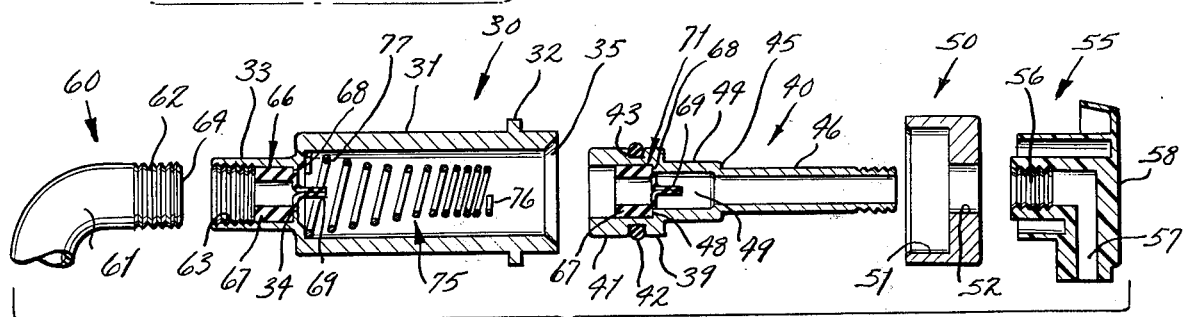
FIG. 3 is an exploded cross-sectional view of the pump of FIG. 1, somewhat enlarged.

The pump generally designated 30 is best shown in the exploded view FIG. 3. It includes a hollow cylindrical member 31 having a flange 32 which, in the assembled view FIG. 1, is positioned abuttingly against the forward end of the bracket 10, its position being maintained by bearing of the set screw 27 against the cylindrical member 31. At the aft end the cylindrical member 31 has a reduced concentric inlet portion 33, leading to an internal shoulder 34 which further reduces the diameter of the inlet opening. Forwardly of the flange 32 the cylindrical member 31 has a tapered forward end opening 35.

Inserted into the hollow cylindrical member 31 through its end opening 35 is the piston portion 39 of a reciprocable tubular member generally designated 40. The piston portion 39 has an outer piston surface 41 sized to fit slidingly within the hollow interior of the cylinder member 31. To obtain a positive sealing fit, a sealing ring such as an O-ring 42 is provided within the groove 43. Forwardly of the piston portion 39 the member 40 has a somewhat reduced diameter portion 44; at its forward extremity a shoulder 45 is provided, to serve as a juncture with a smaller diameter concentric stem portion 46 whose forward end is threaded, to receive a nozzle hereafter described.

The interior of the tubular member 40 is somewhat similarly stepped. The internal juncture of the piston portion 39 with the reduced diameter portion 44 has an internal shoulder 48, forwardly of which is a cavity 49 which leads into the stem portion 46. The internal diameters at and aft of the internal shoulder 48 correspond to those at and aft of the similar shoulder 34 at the rear inlet of the cylindrical member 31.

A cylinder cap generally designated 50 has an internal cylindrical surface 51 sized to fit securely (as by a press fit) onto the outer surface of the cylindrical member 31 forwardly of the flange 32. The cap 50 has a central guide bore or opening 52, sized to permit easy reciprocation therein of the small diameter portion 46 of the reciprocable member 40. The bore 52 is smaller in diameter than the shoulder 45, so as to provide a seat for the shoulder.

The nozzle generally designated 55 is preferably molded of plastic. It has an internally threaded horizontal bore 56 which leads forwardly and downward through a nozzle outlet 57 which is immediately aft of the imperforate front face 58 of the nozzle.

A flexible plastic dip tube generally designated 60 is provided, of such length as to reach from the pump 30 to near the bottom of a vessel, such as the vessel a shown in phantom lines in FIG. 1, whose mouth b has external threads which may be screwed into the internal threads 18 of the bracket 10, thus supporting the vessel a with the dip tube inserted therein as shown in FIG. 1. The upper end 61 of the dip tube is bent through a 90° arc of relatively small radius, to fit within the curve of the bracket aft wall 24, and is provided with external threads 62 to fit within internal threads 63 provided within the rear inlet of the cylindrical member.

Secured forwardly of the internal threads 63 and against the internal shoulder 34 of the cylindrical member 31, and held in position by the forward edge 64 of the dip tube 60, is molded rubber or rubber-like valve generally designated 66, herein referred to as the first valve. This is of the type known as a "duck-bill" valve. It has a hollow circular or cylindrical body portion 67 whose forward edge 68 fits against the internal shoulder 34. Inwardly of the edge 68, the first valve 66 has molded flat, forwardly-extending lips 69, adapted to seal against each other when the pressure external to them is greater than that within the cavity 49, into which they project.

A second valve generally designated 71 is identical to the first valve 66, and its parts are similarly numbered. It is received within the piston 39, its forward edge 68 fitting against the internal shoulder 48 and its lips 69 projecting forwardly within the cavity 49.

Within the cylinder 31 is accommodated a tapered wound wire spring generally designated 75 whose forward end 76 has substantially the same diameter as that of the body portion 67 of each of the valves 66, 71. Its larger diameter aft end portion 77 is smaller than the interior diameter of the cylinder 31 into which it fits as shown in FIG. 3, with the lips 69 of the first valve 66 projecting into the spring 75. On assembly, the forward reduced diameter spring end 76 abuts against the aft edge of the body portion 67 of the second valve 71, holding it in place against the shoulder 48 within the piston 39.

Figure 4:
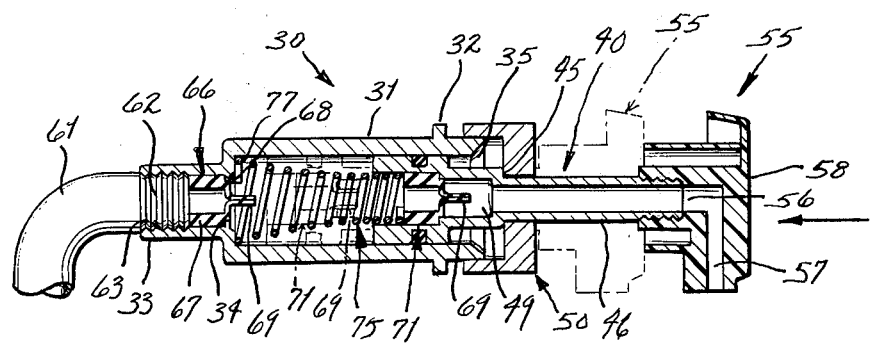
FIG. 4 is an assembled view of the pump, the phantom lines showing the relative positions of the parts as the pump plunger is pressed inwardly.

FIG. 4 shows the valve assembled; and the phantom lines show the piston 39 pressed aft. As it is moved aft, the volume between the first valve 66 and the second valve 71 is decreased, forcing the lips 69 of the second valve open as shown in phantom lines, so that material in the cylinder 31 is driven forward through the tubular member 40. Thus, when a force is exerted against the forward face 58 of the nozzle 55 to press it aft, as shown by the arrow in FIG. 4, a part of the contents of the cylinder 31 will be forced forward through the opened lips 69 of the second valve member 71, the pressure holding closed the lips 69 of the first valve 66. When the force on the nozzle is released, the spring 25 will drive the reciprocable member 40 forward, so reducing the pressure outwardly of the lips 69 of the first valve 66 that atmospheric pressure, exerted through the air inlet 19 on the contents of the vessel a and applied through the dip tube 60, will open the lips of the first valve to refill the cylinder 31.

Referring to the phantom line showing of FIG. 1, the present pump mechanism is easily installed and replaced in service. Thus, should a pump 30 work defectively, it is not necessary to remove the bracket 10 from a wall on which it may be installed, nor even to screw off the bottle a from the bracket internal threads 18. Instead, on loosening the set screw 27 the entire pump mechanism with dip tube attached may be drawn out forwardly as shown in the phantom lines. To replace it, a similar pump unit with dip tube attached is readily installed by forcing the lower end of the dip tube back and camming it downward against the curving aft wall 24. As the tube passed between the guide lobes 25 it will be supported, to assume its final position shown in FIG. 1. This support assures that, regardless how carelessly the dip tube may be handled when the vessel a is removed and replaced, its upper end 61 will not become detached from the cylinder inlet 33.

In contrast to pumps whose valves will not operate reliably except when vertical, the use of the duck-bill type valves 66, 71 assures satisfactory operation in horizontal position. However, their assembly in the present pump is exceptionally simple. The upper end 61 of the dip tube 60 holds the first valve 66 securely within the inlet of the cylinder member 31; while the second valve 71 is held securely within the hollow piston by the reduced diameter forward end 76 of the tapered spring 75. Thus, with a minimum number of parts, the present pump and bracket combination achieves exceptional ease of assembly and replacement. These advantages make it well suited for rough usage, as in factory washrooms, where horizontal-operating dispensers are required, with the advantage of positive pump operation at a cost comparable with gravity-type dispensers.

Another advantage of the present dispenser is its forcible positive pumping action. This permits the pumping of heavy viscous semi-liquids, such as lotion soaps, which cannot be satisfactorily handled in common prior art dispensers of either the pump or the gravity feed type.

Variations in detail of the features of construction will, from this disclosure, be obvious to persons familiar with prior art dispensers.

I claim:

1. A wall-bracket type dispenser utilizing a replaceable pump adapted to pump liquid from a suspended vessel, comprising
   a cylindrical pump of a type adapted to operate when positioned horizontally and having at its forward end a plunger and at its aft end a dip tube, in combination with
   a mounting bracket having an aft mounting portion,
   a hollow, forwardly projecting portion defining a chamber whose forward end is cylindrical and substantially horizontal,
   the chamber having an aft wall including an aft and downward-curving surface portion leading to a downward-presented vessel support opening spacedly forward of the mounting portion,
   said aft wall including a pair of guide lobes projecting forwardly and flanking the vertical central plane of the bracket at a spacing from each other sufficient to accommodate and guide the dip tube, and
   air inlet means into the chamber,
   whereby the pump may be replaceably installed in the forward cylindrical chamber portion by inserting the lower end of the dip tube therethrough and camming it, between said guide lobes, downward against the aft and downward surface portion to emerge and extend downward through the vessel-support opening.

2. A dispenser pump characterized by operability in horizontal position, compactness, and ease of assembly and disassembly, comprising
   a cylinder member having at its aft end a reduced concentric inlet chamber terminating in a shoulder surrounding an inlet to said cylinder member,
   a first molded rubber-like valve having a tubular body portion within said inlet chamber seated against said shoulder and having lips projecting forwardly through said inlet,
   a dip tube whose upper end is retained in said inlet chamber abutting the body portion of said first valve,
   a reciprocable tubular member having a larger diameter piston portion fitted within the cylinder and a smaller diameter concentric stem portion extending forwardly therefrom,
   the piston portion thereof having an aft end bore inlet of larger diameter than the bore of the stem, and terminating forwardly in an aft-presented internal shoulder surrounding the stem inlet,
   a second molded rubber-like valve similar to the first, whose tubular body portion is received within said larger diameter bore inlet and presented against said shoulder, and whose lips project from said shoulder toward the smaller bore stem portion,
   a tapered wound wire compression spring within said cylinder member having its larger end seated at the cylinder inlet about the lips of said first valve and having its smaller end presented retainingly against the circular body portion of said second valve, within the bore inlet of said piston portion,
   means to cap said cylinder and thereby to contain the piston portion of said tubular member within said cylinder member, said means to cap including a central guide opening through which said stem portion of the tubular member may be reciprocated, and
   nozzle means on the tubular member to convey aft movement towards the inlet end of the cylinder member against the compressive resistance of said spring,
   whereby the body portion of the second valve is brought close to the lips of the first valve.

* * * * *